United States Patent Office 2,845,132
Patented July 29, 1958

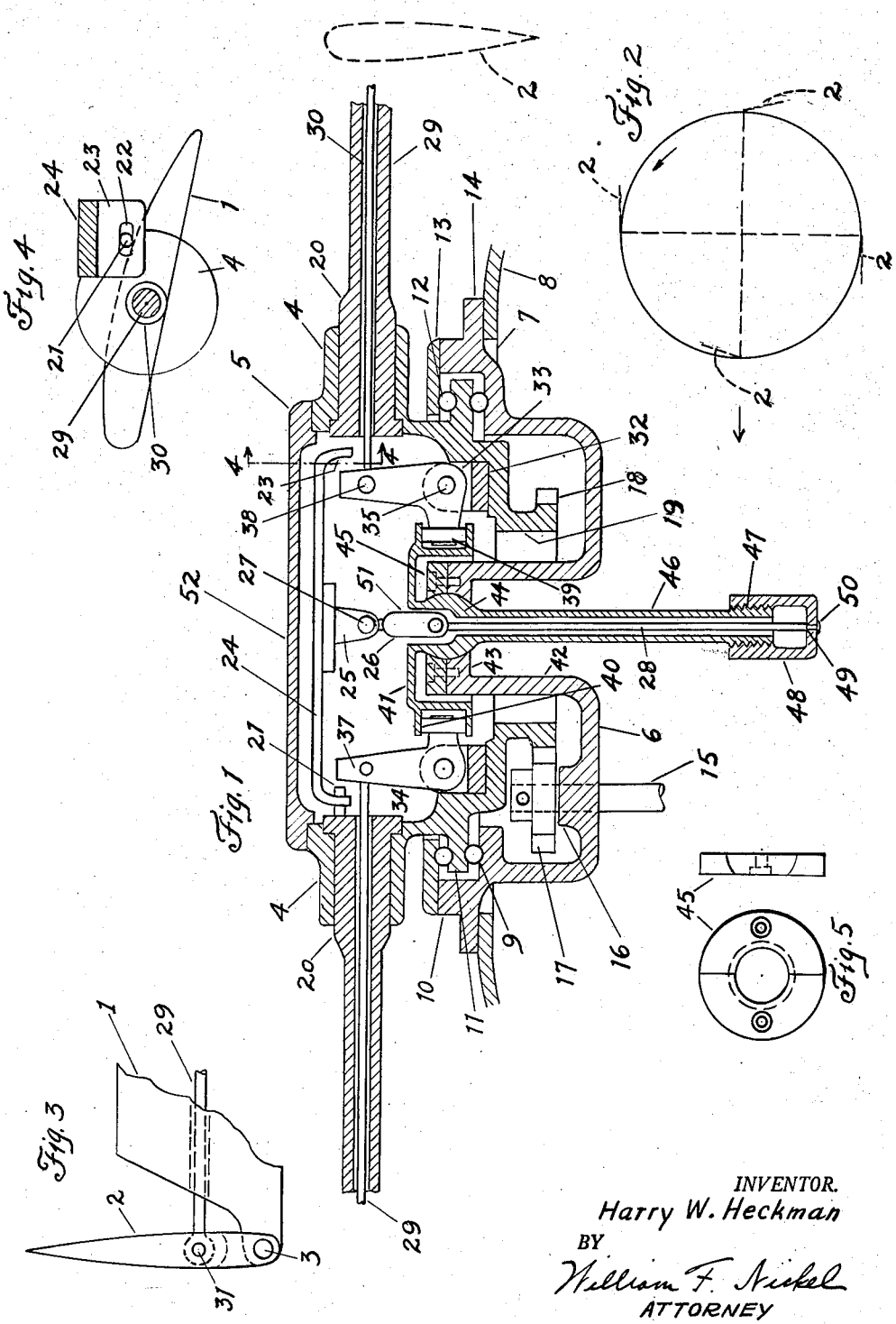

2,845,132
CONTROLLING APPARATUS FOR HELICOPTER VANES AND BLADES

Harry W. Heckman, Massapequa, N. Y.

Application June 14, 1955, Serial No. 515,353

8 Claims. (Cl. 170—160.25)

This invention is an improvement in operating mechanism for aircraft of the helicopter type, and particularly mechanism for controlling the apparatus by which the helicopter is lifted from the ground and projected through the air in flight.

An important object of the invention is to provide a novel and durable construction by which the rotatable blades of the helicopter can be adjusted and the driving vanes controlled in the revolution thereof, with the blades, to produce the required lifting, supporting and propelling effect on the body of the craft.

Another object is to provide apparatus in which the blades can be adjusted and the vanes all properly controlled by members or rods having a common axis extending to a point within easy reach of the pilot.

A further object is to provide connections for the lifting blades, and the propelling vanes comprising parts and members coinciding with the long axis of adjustment of the blades, united to the main controlling member and disposed so that the vanes can be adjusted independently of the blades, and vice versa, and thus perfect operation is at all times easily obtainable.

These and other objects and the advantages of the invention are fully described herein and the novel characteristics are defined in the appended claims. On the drawings a preferred embodiment of the invention is illustrated; but the construction shown is by way of example only; and variations in many respects may be made without omitting or deviating from the main design in which the invention resides.

On said drawings:

Figure 1 is a cross section of the operating, adjusting and controlling mechanism according to my invention.

Figure 2 is a diagram showing how the vanes propel the helicopter.

Figures 3, 4 and 5 show details of the connections for separately adjusting the blades and controlling the vanes, Figure 3 showing in plan the connecting rod for controlling a vane, and Figure 4 being a section on line 4—4 in Figure 1.

The numeral 1 indicates part of a blade at the outer end thereof, carrying a vane 2 mounted on a pivot 3 at its tip. The blades revolve in a horizontal plane, being supported at their inner ends in bearings 4 at the rim of a rotatable head 5. This head or rotor 5 is seated in a housing 6 that is hollow; and fits into an opening 7 at the top of the body 8 of the helicopter, which of course has the desired shape and build; and the housing is affixed to the body 8 by suitable fastening devices. The housing 6 is open at the top and has an internal shoulder 9 adjacent its upper edge surrounded by a rim 10; and the rotor 5 has an external flange or collar 11 encircled by the rim 10; said flange having raceways in both upper and lower faces. In the raceways are antifriction balls 12. On the rim 10 is a retaining ring 13 fixed thereto, and overlapping the flange 11; and the inner face of this ring and the shoulder 9 also have raceways for the antifriction balls or elements 12, so that the rotor can turn freely in the housing 6. On the exterior of the housing 6 is an encircling flange 14 approximately in the plane of the flange 11, overlapping and resting on the edge of the opening 7 of the body 8, and bolted or otherwise secured in said opening 7.

The rotor 5, which also is a hollow unit, is of course driven by the engine, not shown, in the body 8, through a shaft 15, entering the lower end of the housing 6 through a bearing 16. The end of the shaft in the housing carries a fixed gear 17 which meshes with a gear 18 on a central hollow neck 19 at the lower end of the rotor in the housing 6. By power transmitted through the shaft 15 the rotor 5, blades 1, and vanes 2 are revolved together about the vertical axis of the housing 6.

The blades 1 have trunnions 20 at the inner ends, engaged by the bearings 4, and within the rotor; each trunnion has a stud 21. The studs 21 project into slots 22 in the downbent ends 23 of a bar or member 24. The lower side of this member 24 has a central projection or lug 25 connected to a link 26 by a pin 27. This link is united by a similar pin to a downward extending rod 28, which protrudes from the bottom of the housing 6. The studs or projections 21 are all disposed at such points on the inner ends of the trunnions 20 that when the rod 28 is pulled down or pushed up, the pitch of all the blades can be altered; but each blade is always maintained at the same angle as the others to the plane of revolution of the blades 1.

For the controlling of the vanes 2, a rod 29 is disposed in an open bore 30 which extends through each wing from the inner to the outer end thereof. The bore may be in a tubular rib that is part of the structure of the wing. The several rods are connected to the vanes by pivot pins 31. Within the rotatable head 5 is an annular shoulder 32 at the inner end of the neck 19 and about in the same plane as the flange or collar 14 of the housing 6; and on this shoulder are lugs 33, in which bell crank levers 34 are pivotally mounted on pins 35, one such lever being associated with each vane 2 and blade 1. The levers are arranged with one arm 37 upright and united by a pin 38 to the adjacent rod 29; and the other arm of each lever extends toward the center of the rotor and carries a roller 39 on its end. The rollers run in a circular track or channel formed by two parallel rims or flanges 40 on the outside of a head 41, which has the shape of an inverted cup and encircles an inward and upward projecting boss 42 at the center of the housing 6, and projecting into the neck 19 of the rotor. This boss at its inner extremity 43 has a spherically curved seat for a ball 44 which is integral with the member 41 and is held against this seat by a split ring 45 with an inner edge having a suitable curved surface secured to the extremity 43 of the boss 42 by bolts or other means. The ball 44 is integral with a tubular rod 46 which projects down below the housing and contains the rod 28. At its lower end which is within the pilot's reach the tubular rod 46 has threads 47 engaged by a cap nut 48. The nut is pivotally connected to the rod 28 and fits against a shoulder 49 thereon. The end of the rod passes through the nut and is riveted over, as indicated at 50. The pin 27 joining the rod 28 to the link 26 is at the center of the ball 44, which has a recess 51 in its end at its junction with the head 41 to receive the adjacent end of hte link 26.

Obviously when the controlling and adjusting member consisting of the rod 46 and rod 28 within it, is tilted in any direction about the center of the ball 44, the distance between the lower pin connecting the link 26 to the rod 28 never changes, because of the clearance which the recess 51 gives to the link 26. Any adjustment of the blades or wings 1 is therefore not disturbed, but the wings 1 retain their angular setting regardless of the tilting of the concentric rods 28 and 46. The chief controlling member comprising these two rods can therefore be actuated to cause oscillation of the vanes 2 for flight in any direction independently, without effect on the angle of the wings 1 so long as the rod 28 is not pulled down or pushed up in the enveloping tubular rod 46.

To set the wings at the angle required for lifting and supporting the helicopter above the earth, the cap nut 48 is turned on the threads 47 at the lower end of the tubular rod 46. The inside rod 28 is thus moved lengthwise to actuate the member 24 and the studs 21 on the inner ends of the trunnions 20 are caused to shift the wings about their long axes. The rods 29 are not affected at this time.

To propel the helicopter in the desired direction, the tubular rod or bar 46 is tilted to incline the head 41. Such manipulation will raise the channel between the flanges 40 at one point in the circumference of the head 41, and lower it at a point diametrically opposite. When the rotor turns and the blades 1 sweep around, the rollers 39, as they move along the highest part of said channel, tilt the bell crank levers 34 so that in every revolution of the blades 1, the rods 29 are successively pushed outward and the vanes 2 are swung outward about their pivot pins 31. In passing through the lowest part of said channel the rollers 39 have the effect of pulling the rods 29 inward and swinging the vanes 2 toward the center of the rotor 6. For example, if the pilot wants to fly from right to left, with reference to Figure 1, the rotor as viewed from above turning counter clockwise, he tilts the tubular rod 46 to the right in the plane of the illustration. The head 41 with the circular track is raised on the right hand side and lowered at the left side and the vanes 2 at the ends of the rods 29, in Figure 1 will then be caused to swing about their pivot pins 31 so that the trailing edge of a vane 2 passing at the right juts outward with respect to the circle of revolution, while the trailing edge of a vane 2 passing at the left diametrically opposite swings inward. The craft is thus moved to the left by the action of the vanes on the air. As the rollers 39 move between the high and low portions of the channel the vanes are "feathered"; that is they assume neutral positions tangent to the circle of revolution, as indicated on Figure 2.

The rotor has a closure 52 on its top, fixed to the rotor, but removable to permit access to the inside. The rotor may comprise two sections, joined in a transverse plane passing through the middle of the bearings 4, so that the upper section will include the upper halves of the bearings 4 integral with the section. With this design the wings 2 can be conveniently mounted in the rotor by disposing the trunnions 21 in the lower halves of the bearings and then putting on the upper section with the top halves of the bearings 4, enclosing the trunnions completely. The top section will be fastened securely by any suitable means to the remainder of the rotor 6.

My apparatus will serve its purpose effectively when three or four blades are employed, and the operation and method of control will be the same as above described. With three blades the member 24 will comprise three arms with ends connected to the studs 21, and four blades will require four arms, preferably equi-distant from one another. My invention thus constitutes a simple and practical apparatus, easy to manage, not liable to derangement, and well adapted to serve its intended purpose.

The mechanism above described can be altered in structural details such as by the substitution of parts of a different form for the bellcranks 34 and in other ways, without material alteration in the general construction, so that the same principle of operation is retained and the general operation and manner of adjusting the blades and controlling the vanes in the revolution of the blades is the same as herein set forth.

The ring 45 will be in two halves to retain the ball 44 in the end 43 of the boss 42. It can be laid loosely on the end 43 with the halves far enough apart to allow the rod 46 to be passed down into the boss 42 till the ball 44 rests on its seat. The top of the head 41 may have openings not shown, so that tools can be inserted and the halves of the ring 45 pushed together to fit against the upper part of the ball, and screws inserted to hold the ring in place. The rod 28 is passed down through the rod 46 afterwards and into the nut 47, and the rivet 50 then formed at its lower end to hold the nut. In this way the assembly of the parts is facilitated, but other expedients can of course be utilized.

Having described my invention, what I believe to be new is:

1. Controlling mechanism for a helicopter having a body, a housing affixed to the body, a rotor mounted on the housing, means in the housing for turning the rotor, radial blades carried by the rotor, vanes pivotally supported on the blades perpendicular to the plane of revolution, a circular tiltable head having a track around its outer circumference, within the rotor and carried by the housing, means exterior to the housing affixed to said head for adjusting the head at a desired angle and means comprising members connected to the vanes and engaged by said track for periodically swinging said vanes to propel the helicopter in flight, said blades having trunnions at their inner ends, the rotor having bearings for said trunnions, a stud on each trunnion, a member engaging said studs at its ends, and a rod joined to said member and projecting out of the housing, said rod being movable lengthwise to set the blades at a desired angle to lift and support the helicopter, said means affixed to said head enveloping the last-named rod.

2. Controlling mechanism for a helicopter having a body, a housing open at the top secured to the upper part of said body, a hollow rotor in the housing carrying radial blades, means in the housing connected to the rotor to turn the rotor, the housing having a central boss projecting into the rotor, a head in the rotor, a rod affixed to said head and tiltably mounted in the rotor at the inner end of said boss, the head having a circular track extending around its exterior, vanes pivotally mounted on said blades and disposed perpendicular to the plane of revolution thereof, rods in said blades pinned to said vanes at their outer ends, and means in the rotor connected to the rods in the blades and engaged by the track for periodically and successively moving said vanes into and out of position to propel the helicopter as the first named rod is manipulated to tilt said head, said blades having trunnions at their inner ends, the rotor having bearings for said trunnions, a stud on each trunnion, a member engaging said studs at its ends, and a rod joined to said member and projecting out of the casing, said rod being movable lengthwise to set the blades at a desired angle to lift and support the helicopter.

3. Controlling mechanism for a helicopter having a body, a housing open at the top secured to the upper part of said body, a hollow rotor in the housing carrying radial blades, means in the housing connected to the rotor to turn the rotor, the housing having a central boss projecting into the housing, a head in the rotor, a rod affixed to said head and tiltably mounted in the rotor at the inner end of said boss, the head having a circular track extending around its exterior, vanes pivotally mounted on said blades and disposed perpendicular to the plane of revolution thereof, rods in said blades pinned to said vanes at their outer ends, and means in the rotor connected to the rods in the blades for periodically and successively moving said vanes into and out of position to propel the helicopter as the first named rod is manipulated to tilt said head, said blades having trunnions at their inner ends, the rotor having bearings for said trunnions, a stud on each trunnion, a member engaging said studs at its ends, and a rod joined to said member and projecting out of the casing, said rod being movable lengthwise to set the blades at a desired angle to lift and support the helicopter, the rod affixed to the head enveloping the last-named rod.

4. Controlling apparatus for a helicopter having a body, a rotor carrying radial blades mounted on said body, means on the helicopter connected to the rotor to turn the rotor, upright vanes pivotally mounted on the blades, means in the rotor connected to said blades and said vanes for moving said vanes into and out of propelling positions during each revolution of the blades, and for setting the blades at a desired angle, part of said means being tiltably mounted in said rotor and a member connected to the tiltable part of said means, a rod contained within said member united to the remainder of said means, said member and said rod projecting downward and out of the housing, said rod being connected to the remainder of said means for manipulating said remainder.

5. Controlling apparatus for a helicopter having a body, a rotor carrying radial blades mounted on the body, means on the helicopter connected to turn the rotor, upright vanes carried by the blades, means in the rotor connected to the blades for setting the blades at a desired angle, additional means in the rotor connected to the vanes for moving said vanes into and out of propelling positions during each revolution, said last-named means being tiltably mounted in said rotor and a member separately attached to each of said means for manipulating each of said means independently of the other, said member comprising rods one within the other extending down from the rotor, the outer of said rods connected to the additional means and the inner of said rods connected to the first-named means.

6. Controlling apparatus for a helicopter having a body, a rotor mounted on said body, radial blades having trunnions at their inner ends, bearings on the rotor containing said trunnions, the trunnions and blades having central bores therein open at both ends extending through the blades to the tips thereof, upright vanes pivotally mounted on said tips, rods in said bores pivotally connected at one end to said vanes and projecting into the rotor, studs on the trunnions inside the rotor and connections comprising a pair of additional rods projecting down into the body for independently regulating said trunnions and said vanes, said connections also comprising a bar having its ends engaging said studs, a tiltable head in the rotor having an exterior circular track thereon and bell crank levers connected to said rods and engaged in said track one of said additional rods being enveloped by the other.

7. Controlling apparatus for a helicopter having a body, a rotor mounted on said body, radial blades having trunnions at their inner ends, bearings on the rotor containing said trunnions, the trunnions and blades having central bores therein open at both ends extending through the blades to the tips thereof, upright vanes pivotally mounted on said tips, rods in said bores pivotally connected at one end to said vanes and projecting into the rotor, studs on the trunnions inside the rotor and connections comprising a pair of additional rods projecting down into the body for independently regulating said trunnions and said vanes, one of said additional rods enveloping the other, and both being tiltably mounted with respect to said rotor and body.

8. Controlling apparatus for a helicopter having a body, a rotor mounted on said body, radial blades having trunnions at their inner ends, bearings on the rotor containing said trunnions, the trunnions and blades having central bores therein open at both ends extending through the blades to the tips thereof, upright vanes pivotally mounted on said tips, rods in said bores pivotally connected at one end to said vanes and projecting into the rotor, studs on the trunnions inside the rotor and connections comprising a pair of additional rods projecting down into the body for independently regulating said trunnions and said vanes, said connections comprising a bar having its ends engaging said studs, a tiltable head in the rotor having an exterior circular track thereon and bell crank levers connected to said first named rods and engaged in said track, one of said additional rods enveloping the other, the outer being connected to the tiltable head and the inner being movable lengthwise and connected to said bar.

References Cited in the file of this patent

UNITED STATES PATENTS 2,493,041     Stalker _____ Jan. 3, 1950

FOREIGN PATENTS 446,509     Great Britain _____ Apr. 7, 1936